United States Patent [19]

Smith

[11] 4,307,784

[45] Dec. 29, 1981

[54] SHUT-OFF APPARATUS FOR PNEUMATIC DRIVEN TOOLS

[75] Inventor: William S. Smith, Houston, Tex.

[73] Assignee: Dresser Industries, Inc., Dallas, Tex.

[21] Appl. No.: 4,013

[22] Filed: Jan. 17, 1979

[51] Int. Cl.[3] .......................... B23Q 5/06; F01B 25/06; B25B 21/00

[52] U.S. Cl. .......................................... 173/12; 81/470; 415/25; 415/36; 418/41

[58] Field of Search ........................ 173/12; 137/47, 52; 415/25, 36; 418/41; 81/52.4 R, 52.4 B, 470

[56] References Cited

U.S. PATENT DOCUMENTS

| | | | |
|---|---|---|---|
| 379,872 | 3/1888 | Hopkins . | |
| 3,477,521 | 11/1969 | Kiester et al. | 173/12 |
| 3,904,305 | 9/1975 | Boyd . | |
| 4,004,859 | 1/1977 | Borries . | |

OTHER PUBLICATIONS

*Mechanics of Machinery,* 3rd Ed., N.Y., McGraw-Hill Book Co., Inc., 1948, pp. 51, 52.

*Mechanical Engineer's Handbook,* Ed. by Lionel S. Marks, 4th Ed., N.Y., McGraw-Hill Book Co., Inc., 1941, pp. 1013, 1014.

*Primary Examiner*—Robert Mackey

*Attorney, Agent, or Firm*—Roy L. Van Winkle

[57] ABSTRACT

The improved shut-off apparatus for pneumatically driven tools includes an auxiliary shut-off valve located in the flow passageway. The valve is controlled by a control rod which extends through the air motor into engagement with a latching device. The latching device is held in the latched position with the valve open by a movable weighted control member. The movable weighted control member is responsive to inertia so that as the speed of the air motor decreases due to a torque load imposed thereon, the shaft slows causing the inertial movement of the weighted member to release the latching device permitting the auxiliary shut-off valve to close.

5 Claims, 8 Drawing Figures

SHUT-OFF APPARATUS FOR PNEUMATIC DRIVEN TOOLS

BACKGROUND OF THE INVENTION

This invention relates generally to an improved torque responsive shut-off apparatus for pneumatically driven tools. More particularly, but not by way of limitation, the improved shut-off apparatus of this invention is responsive to inertial forces exerted on a weighted member to shut-off the air supply to the tool.

Shut-off devices previously constructed generally have been responsive to centrifugal forces or to spring forces which oppose such centrifugal forces to shut-off the air supply to the motor. For example, U.S. Pat. Nos. 3,904,305 issued Sept. 9, 1975 to Horace E. Boyd and 4,004,859 issued Jan. 25, 1977 to John A. Borries, each describe air tools that have speed responsive shut-offs. Each includes a valve that is opened by centrifugal weights and as the motor approaches the stall condition, that is, as the motor slows, a spring overrides the centrifugal force exerted by the weights to close the valve.

Most such devices shut-off before reaching the stall torque, but with speed controlled shut-off it is extremely difficult to accurately control the applied torque when the tool is used with both hard and soft joints.

An object of this invention is to provide an improved shut-off apparatus that stops the air supply to the motor prior to reaching stall torque.

Another object is to provide an improved shut-off device that consistently shuts-off at the desired torque.

SUMMARY OF THE INVENTION

The improved torque responsive shut-off apparatus of this invention includes a shut-off valve located between a main valve and an air motor that is movable between open and closed positions by means of a control member that extends partially through the output shaft of the air motor. A governor is mounted for rotation with the output shaft and includes a latch that is engageable with the control member to hold the valve in the open position and inertia responsive means that is movable relative to the shaft for releasing the latch permitting the valve member to move to the closed position stopping the tool when the air motor slows in response to a predetermined torque being imposed on the output shaft.

BRIEF DESCRIPTION OF THE DRAWING

The foregoing and additional objects of the invention will become more apparent as the following detailed description is read in conjunction with the accompanying drawing, wherein like reference characters denote like parts in all views and wherein.

DETAILED DESCRIPTION OF THE PREFERRED EMBODIMENT

Figure 1:
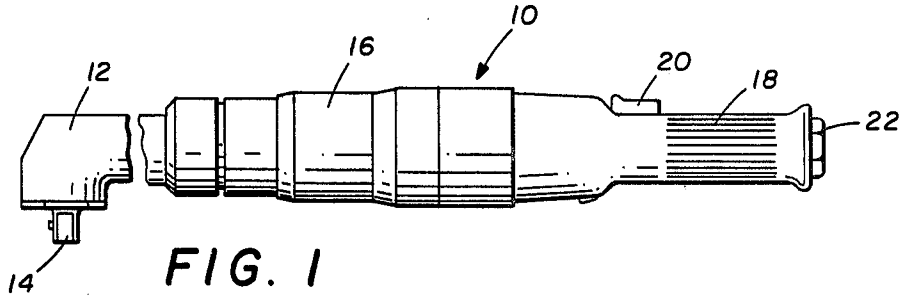
FIG. 1 is an elevation view of an air tool that incorporates the improved torque responsive shut-off means constructed in accordance with this invention.

Referring to the drawing and to FIG. 1 in particular, shown therein and generally designated by the reference character 10 is a pneumatically driven tool that includes a shut-off apparatus constructed in accordance with the invention. As illustrated therein, the tool 10 includes a right angle head 12 having a square drive 14 projecting therefrom for attachment to an appropriate drive socket or the like. Also included is a tool body 16, handle 18 connected to the body 16 that includes a valve actuating lever 20, and a connection 22 for an air supply located on the handle 18. The air supply is not shown, but a suitable flexible air line will be connected to the air tool 10 at the connection 22 as is well known in the art.

Figure 2:
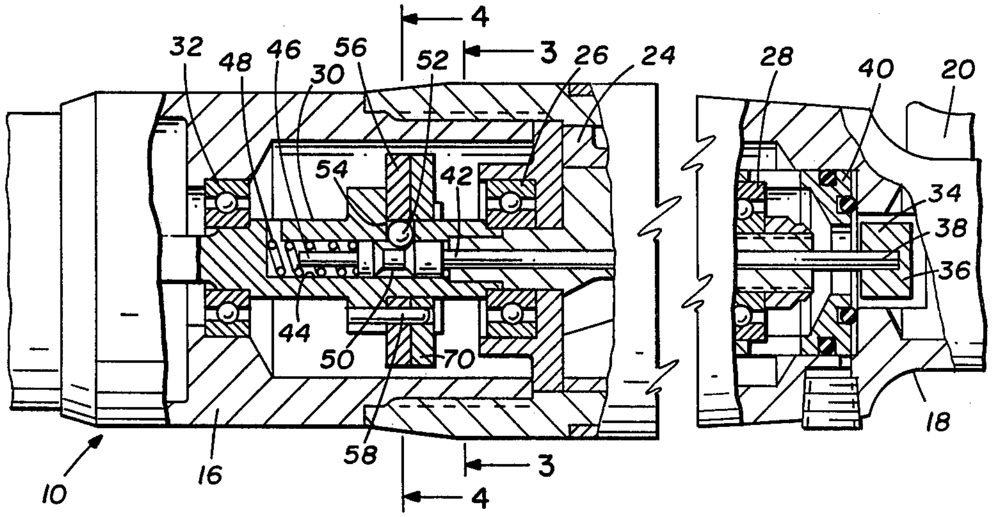
FIG. 2 is an enlarged, partial cross-sectional view, showing the shut-off apparatus in detail.

In FIG. 2, a portion of the tool 10 has been cut away so that the shut-off apparatus may be seen more clearly. Within the body 16 of the tool 10 is located an air motor 24 that is journaled therein by berings 26 and 28. The motor 24 is connected to a hollow output shaft 30 that is journaled in the body 16 by bearings 26 and 32. The output shaft 30 is in turn connected through appropriate gearing to the square drive 14. The valve actuating lever 20 functions to open and close a main air supply valve (not shown) that is located in the handle 18. An auxiliary or shut-off valve 34 is also located in the handle 18 and is provided for reasons that will become more apparent hereinafter.

The shut-off valve 34 includes movable valve member 36 that is mounted on one end of a control member 38 that extends through the air motor 24 and into the output shaft 30. The valve 34 also includes an annular valve seat 40 that is arranged to be engaged by the valve member 36 when the valve is closed. It should be pointed out that the valve member 36 is positioned relatively close to the annular valve seat 40 when in the open position.

The valve control member 38 has an end 42 extending into a cavity 44 formed in the output shaft 30. Also located in the cavity 44 is a latch member 46 that is slidable therein and biased toward the control member 38 by a spring 48 that is also disposed in the cavity 44.

The latch member 46 is provided with a recess 50 located intermediate the ends thereof that is sized to receive a ball-type detent 52. The detent 52 is located in a radially oriented hole 54 that extends through the wall of the output shaft 32. The detent 52 is prevented from moving outwardly, except as will be explained hereinafter, by a weighted member 56 that is pivotally mounted on the output shaft 30 by pivot pin 58.

Figure 4:
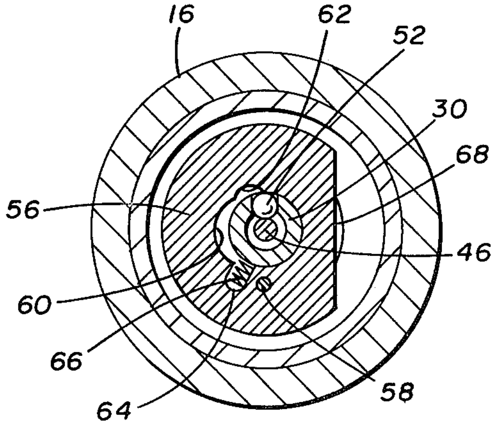
FIG. 4 is a cross-sectional view taken generally along the line 4—4 of FIG. 2.
Figure 5:
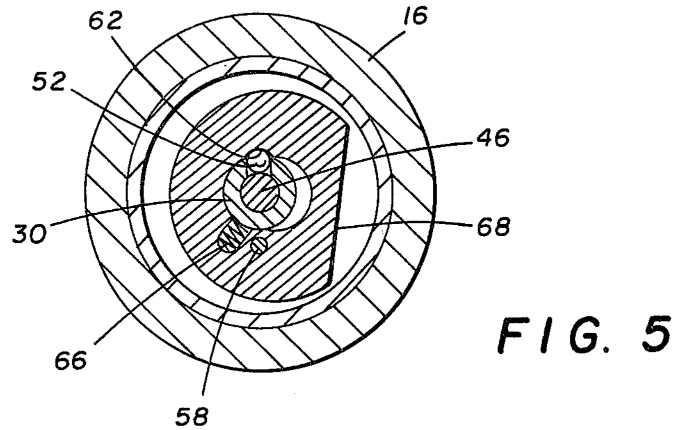
FIG. 5 is a cross-sectional view similar to FIG. 4 but showing the inertial member in a different operating position.

As may be seen more clearly in FIG. 4, the weighted member 56 is provided with a slightly elongated opening 60 that permits the weighted member 56 to move in pivotal motion relative to the shaft 30. The weighted member 56 is provided also with a recess 62 for receiving the detent 52 when in an unlatched position as will be explained and with a second recess 64 that carries a small compression spring 66 that functions to retain the weighted member 56 in the latched position as illustrated in FIG. 4 until certain events occur. It will be noted that the weighted member 56 includes a flat side 68 so that the center of gravity of the weighted member 56 will be to the left of the center line of the shaft 30 as seen in FIG. 4.

In separation, the output shaft 30 rotates at a relatively high speed and the weighted member 56 would cause severe vibration in the tool due to the eccentric location of the center of gravity. To counteract this vibration, a second weighted member 70 is mounted on the shaft 30 in juxtaposition with the weighted member 56. As may be seen in FIG. 3, the weighted member 70 also includes a flat side 72 so that the weighted member 70 has a center of gravity that is located in opposition to the center of gravity of the weighted member 56 thus balancing the mechanism during rotation.

Figure 3:
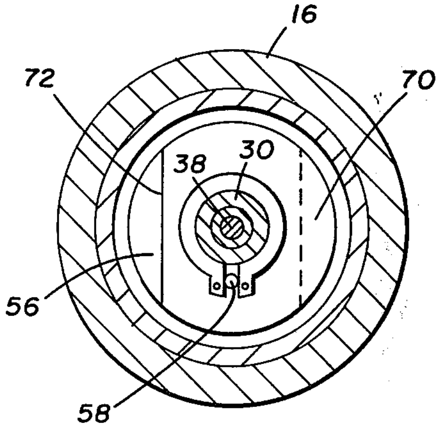
FIG. 3 is a cross-sectional view taken generally along the line 3—3 of FIG. 2.

To describe the operation of the tool 10, assume that the air supply is connected to the connection 22 and that the various components of the tool 10 are in the position illustrated in FIGS. 2–4, and that the shut-off valve 34 is in the open position and the latch member 46 is in the position illustrated in FIG. 2. With the parts arranged thusly, air will, upon depression of the valve lever 20 enter the interior of the handle 18 passing by the shut-off valve 34 and flowing into the air motor 24, causing rotation of the air motor.

Rotation of the air motor 24 is transmitted via the output shaft 30 to the right angle drive mechanism and subsequently to the square drive 14. When the nut or other object being driven by the square drive 14 tightens, the torque exerted back through the output shaft 30 into the air motor 24 slows the motor and the output shaft 30. When this occurs, inertial forces acting on the eccentric center of gravity of the weighted member 56 causes the weighted member 56 to pivot about the pivot pin 58. Such movement aligns the recess 62 in the weighted member 56 with the detent 52.

The flow of air by the valve member 34 (which was previously described as fitting rather closely relative to the seat 40), moves the valve member 34 toward the closed position. As the valve member 34 moves toward the closed position, the detent 52 is forced outwardly into the recess 62. When the valve member 36 lands on the seat 40, air flow is stopped to the motor and the air tool 10 stops running.

From the foregoing, it can be appreciated that the weighted member 56 with its eccentric center of gravity is arranged so that as soon as the negative acceleration, that is the rate of slowing of the output shaft 30, reaches a certain value, the weighted member 56 pivots shutting off the tool 10 prior to stalling of the air motor. Stated in another way, the pivotal movement of the weighted member 56 to shut-off the tool 10 occurs when the inertial force generated by deceleration exceeds the centrifugal force tending to maintain the weighted member 56 in the latched position due to its eccentric center of gravity.

Accordingly, the tool 10 with the improved shut-off mechanism can be more accurately controlled as to shut-off/torque relationship regardless of whether the fastener is being made up in a hard joint or a soft joint. In a hard joint the tool speed changes very rapidly while in a soft joint the tool speed changes relatively slowly and the variation in the make up speed between the two types of joints makes it difficult to control the tool shut-off accurately when tool speed is the critical factor. It also avoids the uncomfortable if not dangerous recoil of the tool if stall condition is reached, prior to shutting off of the air supply.

The tool 10 cannot be restarted as long as the valve lever 20 is depressed and air pressure is applied on the valve 34. However, upon release of the lever 20, pressure is relieved on the valve member 36 and the spring 48 located in the output shaft 30, drives the latch member 46 and the valve control member 38 to the right as seen in FIG. 2 forcing the shut-off valve 34 off the valve seat 40. When the groove 50 in the latch member 46 is in alignment with the detent 52, the detent 52 drops clear of the recess 62 in the weighted member 56 and the spring 66 therein causes the weighted member 56 to pivot to its original position as shown in FIG. 4. When this occurs, the tool 10 is in condition to be restarted.

Figure 6:
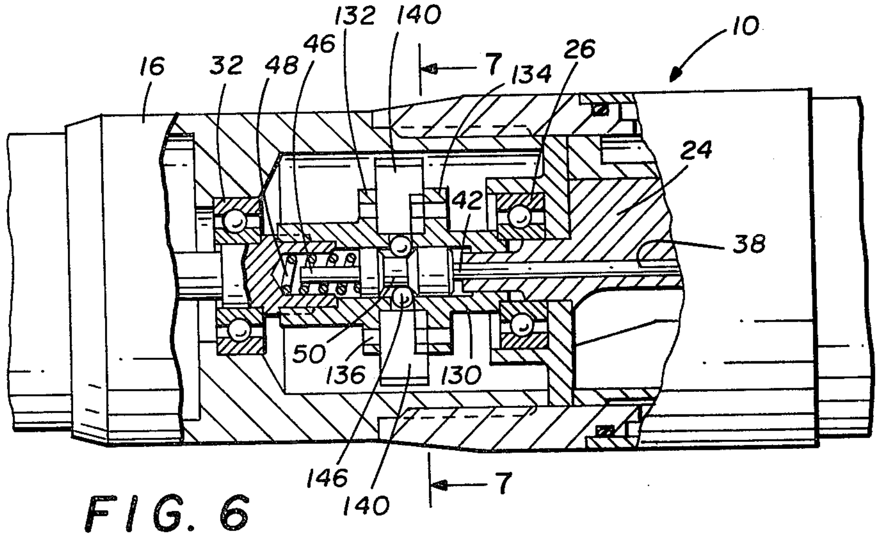
FIG. 6 is an enlarged, partial cross-sectional view similar to FIG. 2, but illustrating another embodiment of torque responsive shut-off apparatus that is also constructed in accordance with the invention.

Detailed Description of the Embodiment of FIG. 6

Figure 7:
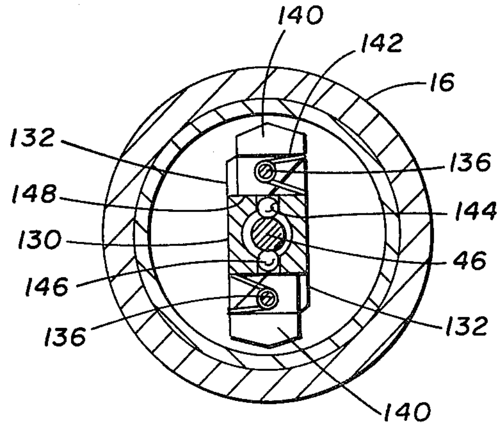
FIG. 7 is a cross-sectional view taken generally along the line 7—7 of FIG. 6.
Figure 8:
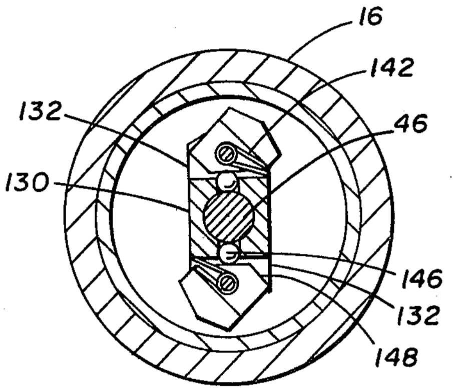
FIG. 8 is a cross-sectional view similar to FIG. 7 but illustrating the parts thereof in another operating condition.

FIGS. 6, 7 and 8 illustrate another embodiment of the improved shut-off mechanism that is constructed in accordance with the invention. The mechanism is installed in the same tool 10 and necessitates modifications only to very few of the parts. Therefore, those parts which are not modified are designated by the same reference characters utilized in the description of the embodiment of FIG. 2. Although not shown in FIG. 6, it will be understood that the valve control member 38 extends into connection with a valve that is flow actuated as described in connection with the valve 34 of FIG. 2.

In the embodiment of FIG. 6, the output shaft is designated by the reference character 130. The shaft is supported between the bearings 26 and 32 as was the shaft 30 of FIG. 1. However, it should be noted that the shaft 130 includes spaced lugs 132 and 134 projecting from one side of the shaft 130 and identical pair of spaced lugs projecting from the opposite side of the shaft 130. Each set of lugs is provided with a pivot pin 136 that extends therethrough and extends through a pair of identical although oppositely disposed weighted members 140.

A spring 142 encircles each of the pivot pins 136. Each of the springs 142 has one end in engagement with a weighted member 140 and the opposite end in engagement with the output shaft 130 so that the weighted members 140 are biased toward the position illustrated in FIG. 7.

It will be readily apparent from viewing FIG. 7 that the weighted members 140 have their center of gravity located at a point that is eccentric to the pivot pins 136. Also, it will be noted in that figure that the output shaft 130 is provided with a pair of radially oriented ports 144. Each port 144 is provided with a ball type detent 146. A flat surface 148 located on each of the weighted members 140 is arranged to extend over the ports 144 preventing the detents 146 from moving outwardly, thus retaining the shut-off mechanism in the latched position and holding the valve 34 open.

In operation, assume that the various components of the latching mechanism are in the position illustrated in FIGS. 6 and 7, that is, in the latched position with the valve 34 retained in the open position as described in connection with FIG. 2. In this position, actuation of the valve lever 20 admits air into the tool which passes by the shut-off valve 34 into the air motor 24 causing rotation of the air motor and of the output shaft 130. The rotation of the air motor 24 continues until the fastener reaches a specified torque, at which point the output shaft 30 starts to slow and the rate of deceleration and the inertia of the weighted members 140 causes them to pivot about the pivot pins 136 into the unlatched position illustrated in FIG. 8.

As shown in that figure, the surfaces 148 are moved away from the ports 144 permitting the detents 146 to move outwardly out of the groove in the latch member 46 (see FIG. 6), releasing the latch member 46 so that the valve 34 closes in response to air flow thereby. Thus, the air motor is stopped and the tool is shut down prior to reaching the stall torque. As mentioned in connection with FIG. 2, such an arrangement avoids the shock of having the air motor run until stall torque is reached, thereby providing a much more accurate shut-off point and with less discomfort to the operator of the tool. Also, as mentioned in connection with the embodiment of FIG. 2, the shut-off point can be accurately controlled since shut-off occurs when the inertial force on the weighted members 140 due to slowing, exceeds the centrifugal force developed by tool speed.

The foregoing detailed descriptions are provided by way of example only and it will be understood that many changes and modifications can be made without departing from the spirit of the invention.

The embodiments of the invention in which an exclusive property or privilege is claimed are defined as follows:

1. An improved torque-responsive, shut-off apparatus for pneumatically driven tools that include an air motor driving a rotatable output shaft arranged to rotate a tool rotatably driven by said output shaft, an air supply and a main valve located in an air supply passageway for controlling air flow from the air supply to the motor, the improvement comprising:

a shut-off valve located between the main valve and the motor, said valve including a valve seat encircling the air supply passageway, a valve member fitting relatively closely in the air supply passageway, said valve member being movable into and out of engagement with said valve seat to close and open said valve, respectively, and an elongated valve control member having a first end connected to said valve member and having a second end extending partially through said output shaft;

governor means mounted for rotation with the output shaft and including latch means slideable relative to said output shaft and engageable with the second end of said control member to hold said valve member away from said seat and inertia responsive means movable relative to said shaft for releasing said latch means permitting said valve member to move into engagement with said seat closing said shut-off valve and stopping the tool when said air motor slows in response to a pre-determined torque being imposed on said output shat; and, said inertia responsive means includes a weighted member having its centroid spaced from the axis of the output shaft and said governor means also includes a second weighted member fixed against movement relative to the output shaft having a centroid located to balance said first mentioned weighted member.

2. The shut-off apparatus of claim 1 wherein said latch means includes:

a latch member having a recess intermediate its ends, said latch member being slidably located in the output shaft in engagement with the second end of said valve control member;

a detent member located in said recess in engagement with said latch member and said first mentioned weighted member when said shut-off valve is open and moved out of said recess upon inertial movement of said first mentioned weighted member to permit said shut-off valve to close.

3. The shut-off apparatus of claim 2 and also including resilient means disposed in said output shaft in engagement with said latch member for biasing said latch member toward the latched position and for biasing said control member in a direction to move said shut-off valve to the open position.

4. The shut-off apparatus of claim 2 wherein said weighted members are each generally circular plates having a segment removed.

5. The shut-off apparatus of claim 4 wherein:

said first mentioned weighted member is pivotally mounted on said output shaft and includes an enlarged bore permitting such pivotal movement and a recess in said bore for receiving said detent when said member is pivoted; and, spring means operably disposed between said first mentioned weighted member and said output shaft for biasing said weighted member toward a position wherein said detent is disposed in the recess in said latch member.

* * * * *